United States Patent [19]

Kimball

[11] Patent Number: 4,593,519
[45] Date of Patent: Jun. 10, 1986

[54] APPARATUS FOR PICKING UP OBJECTS RANDOMLY DISTRIBUTED ON A SURFACE

[76] Inventor: Jerome W. Kimball, 2602 Whitaker St., Savannah, Ga. 31401

[21] Appl. No.: 534,909

[22] Filed: Sep. 22, 1983

[51] Int. Cl.⁴ .......................................... A01D 51/00
[52] U.S. Cl. ................... 56/328 R; 414/440
[58] Field of Search .............. 56/328 R, 202, 203, 56/200, 204; 414/440

[56] References Cited

U.S. PATENT DOCUMENTS

| | | | |
|---|---|---|---|
| 1,798,021 | 3/1931 | Jerram | 56/200 |
| 2,658,637 | 11/1953 | Bailey | 56/328 R |
| 2,729,046 | 1/1956 | Patterson | 56/328 R |
| 2,792,955 | 5/1957 | Sumner | 414/440 |
| 2,989,833 | 6/1961 | DeFino | 56/200 |
| 3,744,225 | 7/1973 | Reeves | 56/328 R |
| 3,748,838 | 7/1973 | Woodfill | 414/440 |
| 3,757,503 | 9/1973 | Soldaviny | 56/202 |
| 3,837,157 | 9/1974 | Van der Lely | 56/202 |
| 3,888,370 | 6/1975 | Gamblin | 56/328 R |
| 3,995,759 | 12/1976 | Hollopuck et al. | 56/328 R |
| 4,077,194 | 3/1978 | Livingston | 56/328 R |
| 4,077,533 | 3/1978 | Meyer | 56/328 R |
| 4,318,654 | 3/1982 | Lee | 414/440 |

Primary Examiner—Paul J. Hirsch
Attorney, Agent, or Firm—Cushman, Darby & Cushman

[57] ABSTRACT

A method and apparatus for picking up objects randomly distributed on a surface, for example nuts on the ground, in which a wheel made up of a plurality of coaxially mounted, flexible cylindrical discs separated by flexible spacers is rotated over the ground so that nuts become wedged in the spaces between adjacent discs and rotate with the wheel. Ejector rods fixed to a handle eject the wedged nuts into a basket pivotably mounted on the handle.

16 Claims, 5 Drawing Figures

APPARATUS FOR PICKING UP OBJECTS RANDOMLY DISTRIBUTED ON A SURFACE

BACKGROUND AND SUMMARY OF THE INVENTION

The invention relates to an apparatus and method for picking up objects randomly distributed on a surface, such as nuts on the ground.

In both commercial and personal activities, situations occasionally arise where randomly distributed objects on some surface, typically on the ground, must be picked up and placed in some recepticle. Tennis and golf balls, which accummulate during practice, are one example. The harvesting of fruits and nuts is another.

Nuts are typically harvested by the owner of one or a few trees by simply allowing the nuts to fall to the ground and then picking them up by hand where they lie. Owners of some kinds of orchards can utilize machines which shake the trees to dislodge the nuts or fruit which then fall onto a canvas sheet or the like which collects them.

Other nuts, such as pecans, are typically harvested only after they have fallen onto the ground. Mechanical devices with fingers which can be opened and closed permit individual nuts to be picked up one at a time without stooping over. Obviously, collection of nuts in this fashion is time consuming and tedious.

Mechanical harvesters are also utilized which simply pick up by way of vacuum everything loose beneath the tree and then separate the leaves, the sticks and dirt from the nuts which are then placed in a basket or the like. Such devices are complex and expensive. In addition, they typically miss some of the nuts on the ground and require that the ground be substantially clean before harvesting.

The present invention relates to a unique method and apparatus which will effectively and efficiently pick up objects randomly distributed on a surface, for example, nuts on the ground. The device is formed of a plurality of coaxially mounted, flexible, cylindrical discs which are separated from adjacent discs by flexible spacers. The discs and spacers form a wheel which is rotated over the ground so that the nuts become wedged in the spaces between adjacent discs and rotate with the wheel. Structure for ejecting the nuts from the spaces, preferably into a basket or the like, is mounted on the device above the ground so that nuts rotating with the wheel are ejected as they encounter the ejector.

The apparatus of the present invention will operate even in tall grasscontaining debris such as with sticks, leaves and the like, picking up only very minimal amounts of the unwanted debris. The apparatus is simple and is readily adaptable to hand operation by an owner of only a few trees or mechanized operation for large scale harvesting.

For a manually operated device, the wheel is preferably mounted to a handle which also mounts a number of rods extending into the spaces between the discs and serving to eject the wedged objects into a basket pivotally mounted on the handle. The basket can be moved between a collection and a dump position for easily removing the collected nuts or other objects.

Other objects and purposes of the invention will be clear from the following detailed description of the drawings.

DETAILED DESCRIPTION OF THE DRAWINGS

Figure 1:
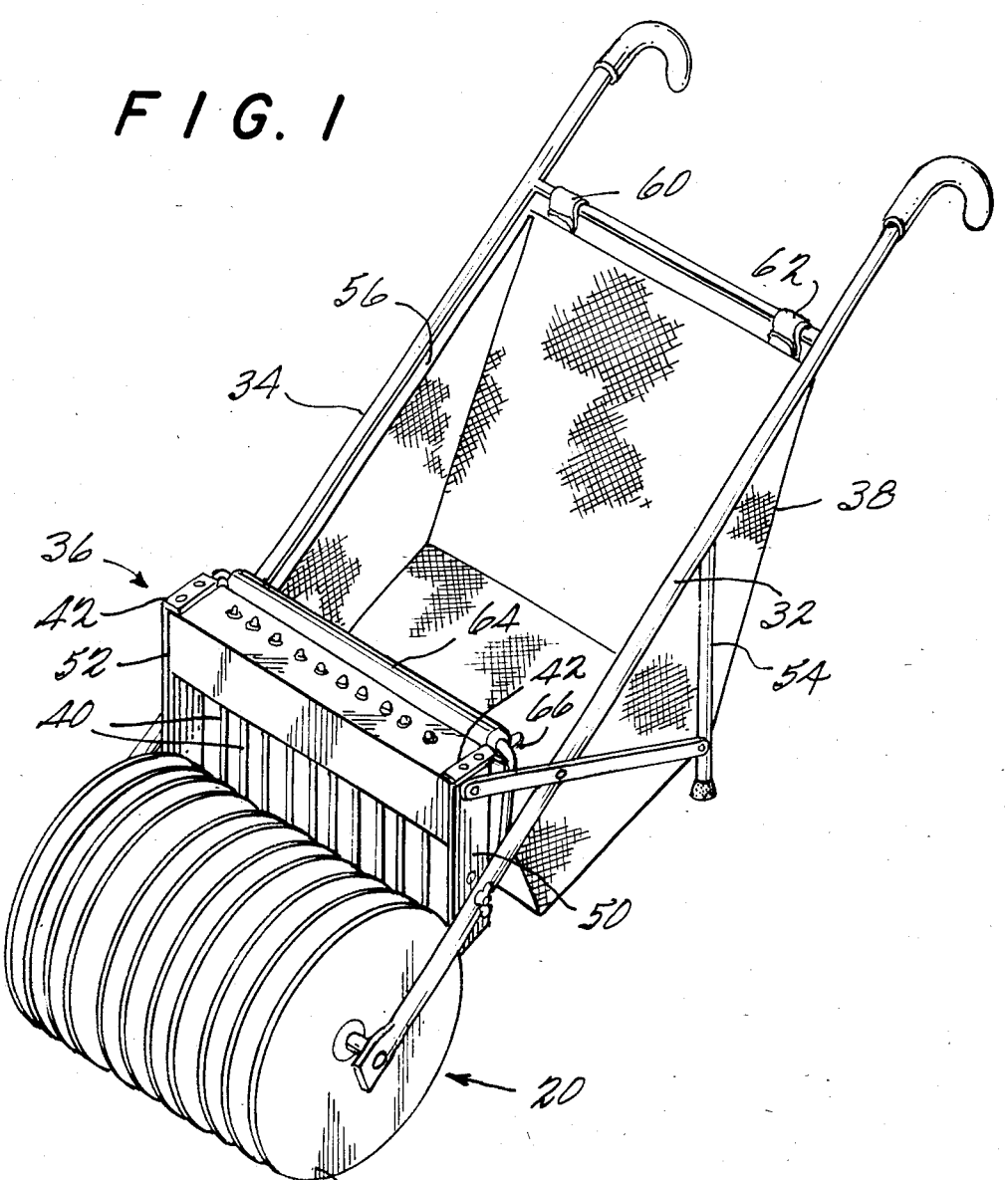
FIG. 1 shows a perspective view of the apparatus of the present invention in normal position for picking up randomly distributed objects.
Figure 2:
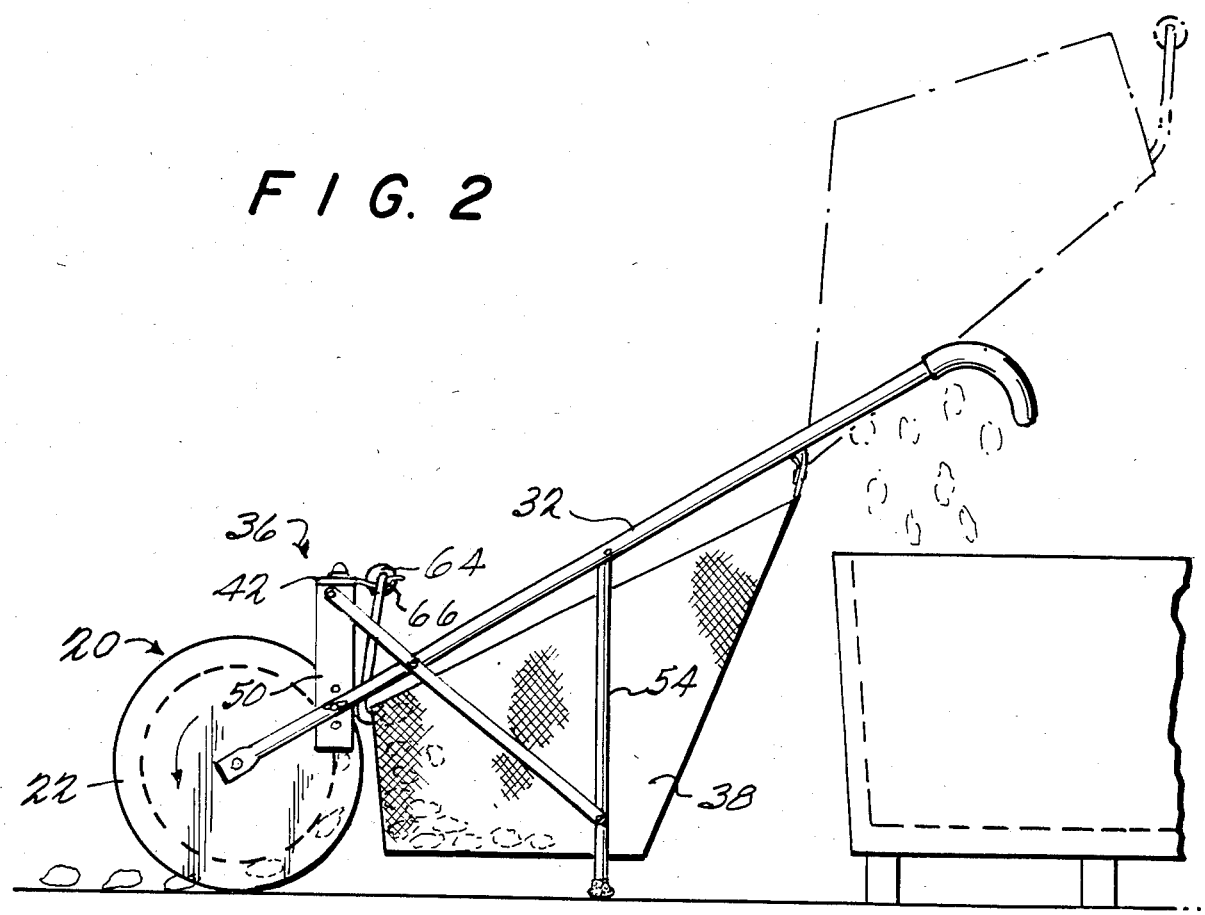
FIG. 2 shows a side view of the apparatus of the present invention.

Reference is now made to FIGS. 1 and 2 which show a first embodiment of the present invention. The heart of the apparatus is a large wheel 20 which is formed of a plurality of thin, cylindrical discs 22, for example of plastic material. Each such disc is provided with a central bore. The discs are separated from adjacent discs by spacers 26 of greater thickness than the disc 22 and preferably of a softer and more flexible material, for example foam rubber. The discs can be die cut from rigid plastic sheets and the spacers 26 similarly die cut from foam rubber sheets, preferably into circular shapes. The spacers 26 and discs 22 are coaxially mounted together by an axle 30, the respective ends of which are secured by lock nuts or the like to handles 32 and 34. The end of handles 34 and 32 remote from wheel 20 are curved so as to be easily grasped manually and to permit rolling of the wheel over a surface such as the ground to pick up objects such as nuts.

Figure 4A:
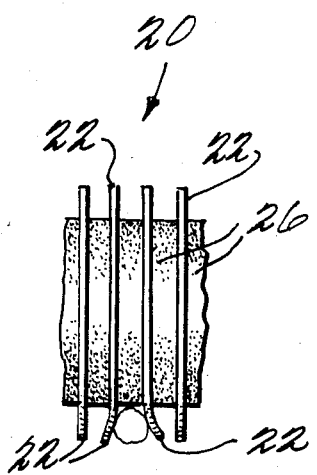
FIGS. 4A and 4B show an assembled view the wheel with an object lodged in one of the spaces and an exploded view thereof.
Figure 4B:
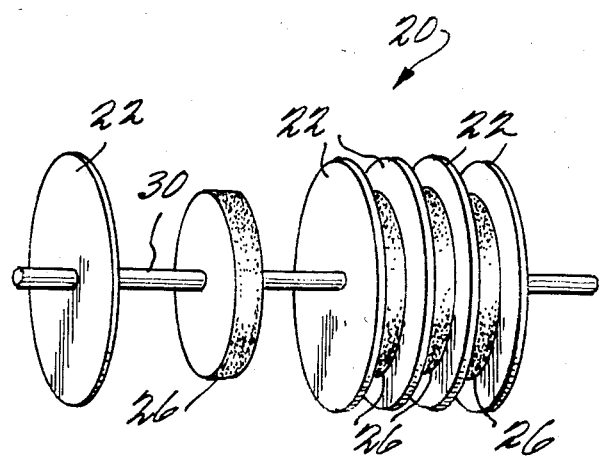

When wheel 20 rolls over a surface having objects thereon with dimensions slightly greater than the separation between adjacent discs 22, the discs are pried apart by the objects which are wedged in the spaces between the discs as can be seen best in FIG. 4A. The objects thus wedged rotate with wheel 20.

Figure 3:
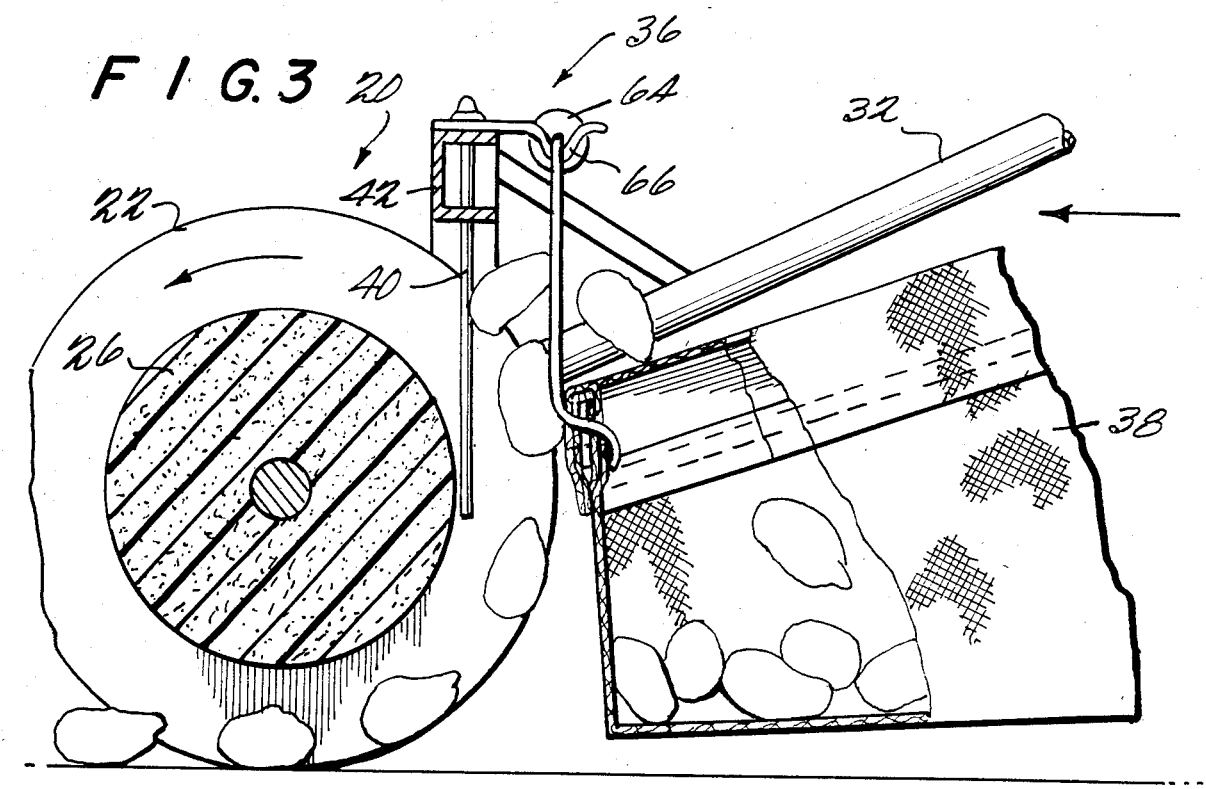
FIG. 3 shows a detailed view of the ejector and basket and their attachment to the handle.

An ejector 36 is mounted above the ground for ejecting the wedged objects into a basket 38. Ejector 36 includes a plurality of rods 40 which extend downward in a substantially vertical direction into the spaces between the discs 22. As can be best seen in FIG. 3, rods 40 act to eject the objects which fall directly into basket 38. The rods 40 are mounted on a bracket 42 and pass through matching bores therein. The rods can be of any shape and are of a suitable length to eject the objects. Preferably the rods extend to the periphery of spacers 26 and are located at the periphery of the spacers 26. Side elements 50 and 52 attach bracket 42 to handle members 32 and 34, respectively. Members 54 and 56 likewise attach to handle 32 and 34, respectively, to permit the apparatus to rest on the ground with the basket above the surface thereof.

Basket 38 is pivotally connected at brackets 60 and 62 to handles 32 and 34, respectively. The other end of basket 38 is provided with handle member 64 which rests in a bracket 66 attached to bracket 42 to permit the basket to be easily and readily pivoted from the position illustrated in FIG. 1 to the dashed line position of FIG. 2 in which the pecans or other objects can be easily dumped into some suitable container. The basket can be made of any medium weight fabric or canvas having reinforced seams and edges where necessary.

Of course, the dimensions and specific characteristics of the apparatus can be chosen in accordance with the characteristics of any objects to be picked up. For a manual unit to pick up pecans, 18 plastic discs 22, 12 inches in diameter and 0.4–0.6 inches in thickness, have proven to be quite satisfactory. With such an arrangement 17 spacers, 8 inches in diameter and ½–¾ inch in thickness of foam rubber, will provide the desired flexibility.

A number of changes and modifications could be made in the above-described embodiment of the invention. For example, rubber tire wheels could be attached to the main frame near the rear at the best balancing point. This would enhance maneuvering and lifting of the main disc wheel during operation. The discs on the main wheel could be embossed, roughened or rubberized for firmer gripping effect. In addition or alternatively, the disc could be fluted on the outer edge. The unit can be operated manually, as in the described embodiment, or easily modified to be used with power equipment, for example in front of a riding law mower, three-wheel terrain vehicle, garden tractor, or the like. The disc wheel can be used in multiples and increased to gang units for larger working areas. The use of a flexible axle mounting together the disc and spacers would allow the disc to follow the contour and might be particularly satisfactory in an area where the ground was uneven. Universal-type connections between a number of different wheels also would permit operation on uneven ground.

What is claimed is:

1. Apparatus for picking up objects randomly distributed on a surface comprising:
a plurality of thin flexible cylindrical discs having a given diameter;
a plurality of spacers of softer and more flexible material than said discs;
means for mounting said discs coaxially for rotation and thereby rolling movement over said surface with at least one spacer between adjacent discs so that said discs are separated at their periphery and flexibly displaced from adjacent discs to wedge said objects therebetween as said discs are rolled over said objects and the wedged objects thereafter rotate with said discs; and
means for removing said wedged objects from between said discs.

2. An apparatus as in claim 1 wherein said spacers are cylindrical and have a diameter less than the diameter of said discs.

3. An apparatus as in claim 2 wherein said spacers are thicker then said discs.

4. An apparatus as in claim 1 wherein said discs are plastic and said spacers are foam rubber.

5. An apparatus as in claim 1 further including a basket for receiving and holding objects removed from said discs.

6. An apparatus as in claim 5 further including a handle connected to said mounting means for manually pushing said apparatus and wherein said basket and removing means are mounted on said handle.

7. An apparatus for picking up nuts on the ground comprising:
a wheel made up of a plurality of coaxially mounted, flexible, cylindrical discs separated by spacers of softer and more flexible material than said discs;
a frame mounting said wheel for rotation over the ground so that nuts become wedged in the space between adjacent discs as said adjacent discs are forced apart by the nuts and thereafter rotate with said wheel;
means on said frame and extending into the spaces between adjacent discs at a location above the ground for ejecting wedged nuts from said spaces; and
basket means on said frame for receiving and holding the ejected nuts.

8. An apparatus as in claim 7 wherein said spacers are cylindrical and have a diameter less than the diameter of said discs.

9. An apparatus as in claim 8 wherein said spacers are thicker than said discs.

10. An apparatus as in claim 7 wherein said discs are plastic and said spacers are foam rubber.

11. An apparatus as in claim 7 further including a basket for receiving and holding objects removed from said discs.

12. An apparatus as in claim 11 further including a handle connected to said frame for manually pushing said apparatus and wherein said basket and ejecting means are mounted on said handle.

13. An apparatus for harvesting nuts on the ground comprising:
a wheel made up of a plurality of flexible cylindrical discs separated by flexible spacers, said discs and spacers each having a central bore and an axle extending through said bores for coaxially mounting said discs and spacers, said spacers being of softer and more flexible material than said discs;
a handle attached to the ends of said axle for manually rotating said wheel over the ground so that nuts become wedged in the spaces between adjacent discs as said discs are forced apart by the nuts and thereafter rotate with the wheel;
a plurality of rods mounted from said handle and each extending into one of said spaces for ejecting a wedged nut therefrom; and
a basket attached to said handle for receiving and holding nuts ejected from said spaces.

14. An apparatus as in claim 13 wherein said basket is pivotably attached to said handle for pivotable movement to a dumping position.

15. An apparatus as in claim 13 wherein said discs are formed of plastic and said spacers of a foam rubber thicker than said discs.

16. An apparatus for picking up objects randomly distributed on a surface comprising:
a plurality of thin flexible cylindrical discs having a given diameter;
a plurality of spacers of softer material and more flexible material than said discs;
a shaft for mounting said discs and spacers co-axially for rotation and rolling movement over said surface with at least one spacer between adjacent discs so that said discs are separated at their periphery and flexibly displaced from adjacent discs to wedge said objects therebetween as said discs are rolled over said objects and the wedged objects thereafter rotate with said discs;
first and second handle members extending respectively at one end from opposite ends of said shaft and having handles at the other end for manually grasping to move said apparatus;
a first bracket extending between said handle members at a location between the ends thereof;
a plurality of rods mounted from said first bracket and each extending into one of said spaces for ejecting a wedged nut therefrom;
a basket pivotably mounted at one end to said first and second handle members adjacent said other end thereof for manual rotation about a basket axis parallel to the axis of rotation of said shaft; and
a second bracket attached to and extending from said first bracket for supporting the other end of said basket so that objects ejected by said rods fall into said basket and said basket can be dumped by manually lifting said basket upward from said second bracket and rotating said basket around said basket axis.

* * * * *